Dec. 13, 1966  J. JELINEK  3,290,814
MASTER PERSPECTIVE
Filed June 4, 1965
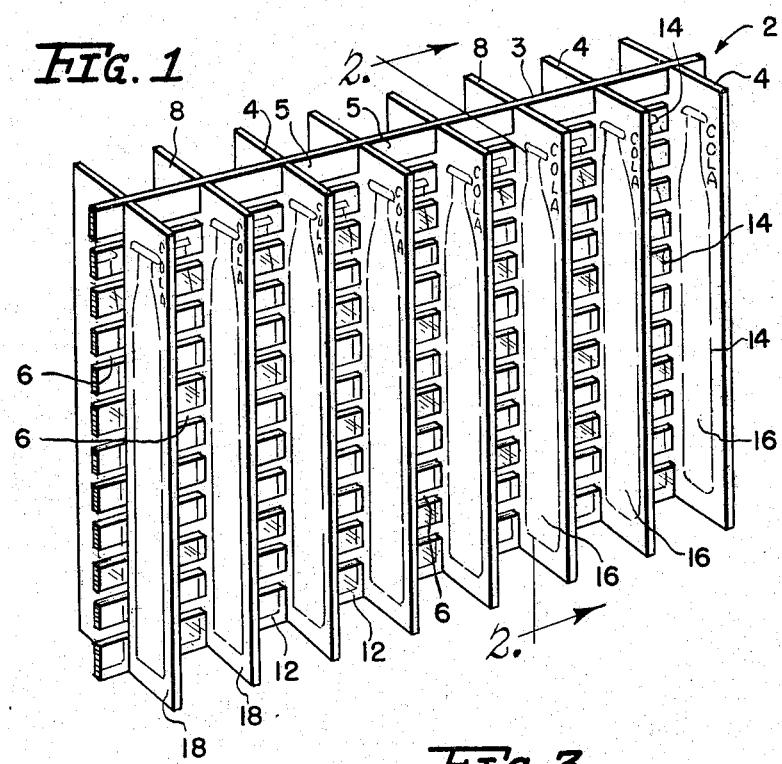
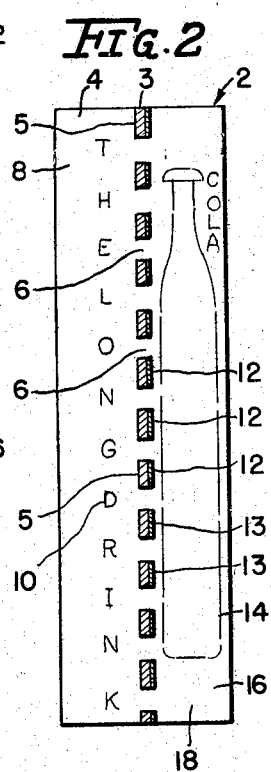
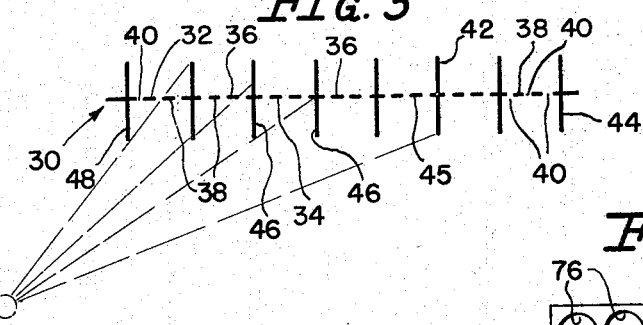
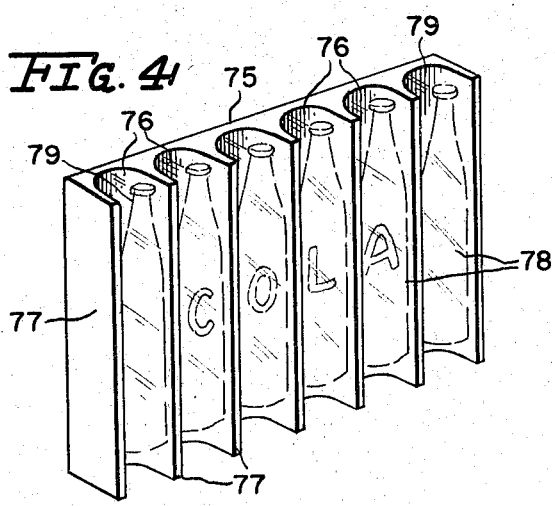
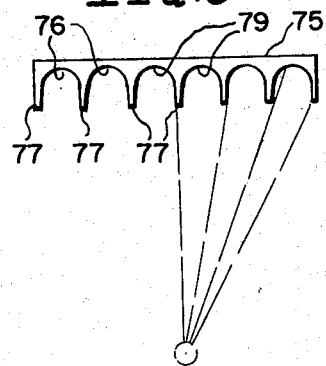
INVENTOR.
Jaroslaw Jelinek
BY John J. Kowalik
Attorney United States Patent Office 3,290,814
Patented Dec. 13, 1966

3,290,814
MASTER PERSPECTIVE
Jaroslaw Jelinek, 3234 W. Evergreen St., Chicago, Ill.
Filed June 4, 1965, Ser. No. 461,465
3 Claims. (Cl. 40—137)

This invention relates to display devices which create different visual effects when viewed from different angles. This application is a continuation in part of my application Ser. No. 237,762, filed Nov. 14, 1962, for Master Perspective, now abandoned.

The perspective devices under consideration utilize a plurality of angularly related elements arranged in groups of isoclinal jointing planes in which one group of jointing planes within a predetermined viewing angle is visible while another is hidden. In these devices each element may provide a segment of a picture and all of the elements of the respective group make up a composite picture. The elements of such group may, of course, provide repeat views, as for example, to give the effect of a case of any particular product such as a soft drink, etc. and would be useful in advertising signs.

The general object of the invention is to devise a novel device for producing a series of illustory pictures, effects or other representations when viewed from different angles.

A further object of the invention is to provide in such perspectives an arrangement of elements in predetermined planes wherein images are provided on certain of the elements and other elements provide mirrored surfaces which reflect the images so as to provide a unique unified composite general image obtaining an attention arresting effect.

In furtherance of the foregoing object, the invention contemplates a structure having a mirrored background and a plurality of picture-displaying panels arranged angularly to the mirrored background wherein the mirrored surface reflects the pictures on the panels when the structure is viewed from certain angles.

A different object of the invention is to provide a novel display wherein the background portion thereof is constituted of a plurality of separated mirror segments so arranged as to reflect the images on the panels which extend transversely of the mirrored segments so as to suggestively reflect the images and wherein the spaces between the mirror segments permit the viewer to see through the background wherein there may be superposed a message or the like relating to the image.

A still further object of the invention is to provide a display device wherein the mirrored areas may be separated either vertically or horizontally in accordance with the effect intended to be achieved.

A still further object of the invention in another embodiment thereof is to provide a curved mirrored surface between pairs of opposed image carrying panels whereby the mirrored surfaces may carry the message which superposes with respect to the reflection of the images from the images on the adjacent panels.

These and other objects of the invention will become more readily apparent from the specification and the drawings, wherein:

FIGURE 1 is a perspective view of one form of the invention;

FIGURE 2 is a cross-sectional view thereof taken substantially on line 2—2 of FIGURE 1;

FIGURE 3 is a top edge view of another form of the invention;

FIGURE 4 is a perspective view of a still further embodiment of the invention, and FIGURE 5 is a top edge view of the structure of FIGURE 4.

DESCRIPTION OF FIGURES 1 AND 2

Referring now to the embodiment of the invention in FIGURES 1 and 2, there is shown a display structure generally designated 2 which is constituted of a background panel portion 3 and a plurality of substantially parallel transverse panel portions 4, 4.

The background portion 3 comprises a plurality of vertically spaced segments or strips 5, 5 which are elongated horizontally of the structure and provide through spaces 6, 6 therebetween which are in the form of narrow slits permitting a viewer in certain positions in front of the sign to see through the background panel 3 to the rear sections 8, 8 of the panels 4 to be able to read any related message such as indicated at 10 comprising as for example the legend "The Long Drink." Of course, the image 10 may comprise different color combinations to fill in the spaces between the segments 5, 5 which provide a reflective front surface 12 which may be in the form of flat mirror segments 13. These mirror segments reflect the images 14 which may be provided on the side faces 16, 16 of the front portions 18, 18 of the side panels 4, 4. The images 14 on portions 18 may be in relief, as embossments or planar and it will be realized that as the angle of view changes the image seen by the viewer changes.

In the example shown in FIGURES 1 and 2 the image is a bottle and it will be seen that when the sign is viewed in perspective, a whole case of soft drink appears, i.e., the pictures on the sections 18, 18 and their reflections on the adjacent portions 5, 5. The legend is visible too. In other words, there are provided complementary images, one reflected and one viewable through the apertures, both being viewed from one position.

DESCRIPTION OF FIGURE 3

FIGURE 3 illustrates a sign or display structure 30 which includes the upright background panel 32 with a front reflective surface 34 subdivided into vertical sections 36. Certain selected sections 36 may comprise a plurality of vertically elongated segments 38, 38 which provide vertical slot 40 therebetween permitting the viewer to look through to the rear section 42 of an adjacent transverse upright substantially flat panel 44 extending substantially normal to the background panel 32 upon which may be imprinted or embossed or otherwise affixed a suitable legend or image, etc., to complement the reflected image 45 on the front mirrored side 34. The sides 34 are disposed in the present embodiment to the adjacent sides 46 of the front portions 48 of the panel elements 44 which are generally parallel. The sections 36 which are not segmented would, of course, merely reflect the image 45 which emanates from the panels 44. Combinations of the sections 36 may be used to obtain any desired effects.

DESCRIPTION OF FIGURES 4 AND 5

The invention of FIGURES 4 and 5 is similar to the previous embodiments. In this structure the background portion 75 comprises a series of arcuate preferably concave mirror sections 76, 76 which are flanked by generally parallel transverse panel sections 77, 77 on which are provided the images 78, 78. These images 78 will reflect in the mirrored surfaces 79, 79 and depending upon the optics of the sections 76 will distort the image to emphasize quantity, that is enlarge the original image or slim such original image like the legendary "before and after" advertisements.

Thus, in each embodiment a novel and effective combination of groups of elements in different planes is utilized to provide a novel display medium for obtaining varied, individually characterized effects. These may be enhanced by highlighting the legends, images or other portrayals behind the background.

It will be realized that several preferred forms of the invention have been disclosed. However, these illustrations are not intended to be in any way limiting and it is intended that the scope of the inventions are as set forth in the appended claims.

It will be understood that the invention comprehends these devices as being solid block or plate members of (Plexiglas) vinyl or polyethylene or other polymeric transparent or translucent materials such as plastics resins, the blocks adapted to be used as floor or wall tiles and wherein the primary images are arranged on the transverse surfaces and the reflective areas are on the background surfaces which are preferably continuous as distinguished from the slotted. Although the drawings show the side elements as being at right angles to the background, they may be at various angles to the reflective background or they may converge with one another and certain of the elements may have the reflective surfaces and the others the primary images. These images may be colors or various designs and the arrangement will obtain an effect in depth.

I claim:

1. In a display, a structure comprising a background portion and a plurality of laterally spaced vertically disposed elements extending transversely of the background portion, said background portion presenting reflective areas between the elements, and said elements having images thereon, and said background portions arranged to reflect said images when said structure is viewed from predetermined angles, said elements having portions in front of the background portion and at least certain of said elements having portions behind the background portion with image means thereon, and the background portion contiguous to the elements with said background portions having slots in the reflective surfaces through which said image means on the respective certain of said portions are visible, said image means and images providing complementary images, one reflected and one viewable through the slots, both being viewed from one position.

2. In a display, a structure comprising a background portion and a plurality of laterally spaced vertically disposed elements extending transversely of the background portion, said background portion presenting reflective areas between the elements, and said elements having images thereon, and said background portions arranged to reflect said images when said structure is viewed from predetermined angles, said background portion comprising a plurality of vertically spaced segments defining horizontally elongated viewing slots therebetween and image means on said elements behind the background portions viewable through said slots from one position concurrently with viewing complementary images on the reflective areas.

3. In a display, a structure comprising a background portion and a plurality of laterally spaced vertically disposed elements extending transversely of the background portion, said background portion presenting reflective areas between the elements, and said elements having images thereon, and said background portion arranged to reflect said images when said structure is viewed from predetermined angles, said background portion comprising a plurality of horizontally spaced vertically elongated segments defining vertical viewing slots therebetween and image means on said elements behind the background portions viewable through the slots from one position while viewing the image on the reflective areas.

References Cited by the Examiner

UNITED STATES PATENTS

| | | | |
|---|---|---|---|
| 261,250 | 7/1882 | Ockelmann | 88—85 |
| 803,750 | 11/1905 | Frey | 161—33 X |
| 2,021,207 | 11/1935 | Stats | 88—85 X |
| 2,088,762 | 8/1937 | Rous | 40—137 |
| 2,273,604 | 2/1942 | Vetter | 88—75 X |
| 2,607,142 | 8/1952 | Lee | 88—75 X |
| 3,022,709 | 2/1962 | Duggan | 40—137 X |

FOREIGN PATENTS

| | | |
|---|---|---|
| 564,129 | 2/1958 | Belgium. |
| 679,211 | 7/1939 | Germany. |

EUGENE R. CAPOZIO, *Primary Examiner.*

HERBERT F. ROSS, *Examiner.*